United States Patent
Zhou et al.

(10) Patent No.: US 11,051,244 B2
(45) Date of Patent: Jun. 29, 2021

(54) ULTRA-WIDEBAND (UWB) RECEIVER DEVICE AND METHOD FOR OPERATING A UWB DEVICE

(71) Applicant: NXP B.V., Eindhoven (NL)

(72) Inventors: Jun Zhou, Irvine, CA (US); Radha Srinivasan, Irvine, CA (US); Brima Babatunde Ibrahim, Laguna Hills, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/428,595

(22) Filed: May 31, 2019

(65) Prior Publication Data

US 2020/0383052 A1    Dec. 3, 2020

(51) Int. Cl.
| | |
|---|---|
| H04W 52/02 | (2009.01) |
| H04B 1/7163 | (2011.01) |
| H04L 25/02 | (2006.01) |

(52) U.S. Cl.
CPC .... *H04W 52/0209* (2013.01); *H04B 1/71637* (2013.01); *H04L 25/0202* (2013.01)

(58) Field of Classification Search
CPC ......... H04W 52/0209; H04W 52/0219; H04W 52/0235; H04W 64/00; H04W 88/06; H04W 52/0232; H04W 52/0267; H04W 52/0274; H04W 52/0238; H04W 52/0245; H04B 1/7156; H04B 2001/71563; H04B 2001/71566; H04B 1/7183; H04B 1/71637; H04L 52/0202; Y02D 30/70
See application file for complete search history.

(56) References Cited

U.S. PATENT DOCUMENTS

| | | | |
|---|---|---|---|
| 7,496,060 B2* | 2/2009 | Ramirez | H04W 88/06 370/311 |
| 7,548,576 B2* | 6/2009 | Dowla | H04B 1/7183 375/130 |
| 8,472,500 B2 | 6/2013 | Marton et al. | |
| 10,826,727 B1* | 11/2020 | Zhou | H04L 7/042 |
| 2007/0081505 A1* | 4/2007 | Roberts | H04W 64/00 370/338 |
| 2008/0310485 A1* | 12/2008 | Soliman | H03M 1/007 375/147 |
| 2010/0220774 A1 | 9/2010 | Park et al. | |
| 2011/0142174 A1 | 6/2011 | Park et al. | |

(Continued)

OTHER PUBLICATIONS

Karapistoli, E et al.; "An Overview of the IEEE 802.15.4a Standard", IEEE Communication Magazine, Jan. 2010, pp. 47-53.

(Continued)

*Primary Examiner* — Hanh N Nguyen

(57) ABSTRACT

Embodiments of a method and a device are disclosed. In an embodiment, a method for operating an ultra-wideband (UWB) device is disclosed. The method involves powering down a first receive path of a multipath UWB device while leaving a second receive path of the multipath UWB device powered up, powering down channel estimation, tracking, and demodulation functions of the second receive path, and performing an acquisition function using the second receive path while the first receive path is powered down and while the channel estimation, tracking, and demodulation functions of the second receive path are powered down.

20 Claims, 8 Drawing Sheets

(56) References Cited

U.S. PATENT DOCUMENTS

2018/0254870 A1    9/2018  Dutz et al.

OTHER PUBLICATIONS

Flury, M. et al.; "Synchronization for Impulse-Radio UWB With Energy-Detection and Multi-User Interference Algorithms and Application to IEEE 802.15.4a", IEEE transactions on Signal Processing, vol. 59, No. 11, Nov. 2011, pp. 5458-5472.
Zubair, M. et al.; "Reconfigurable Dual Mode IEEE 802.15.4 Digital Baseband Receiver for Diverse IoT Applications", Oct. 27, 2016, 5 pages.

* cited by examiner

|  | ACQUISITION | | CHANNEL ESTIMATION | | TRACKING AND DEMODULATION | |
|---|---|---|---|---|---|---|
|  | Rx1 | Rx2 | Rx1 | Rx2 | Rx1 | Rx2 |
| RxMode_0 | ✓ |  | ✓ |  | ✓ |  |
| RxMode_1 | ✓ |  | ✓ | ✓ | ✓ | ✓ |
| RxMode_2 | ✓ | ✓ | ✓ | ✓ | ✓ |  |
| RxMode_3 | ✓ | ✓ | ✓ | ✓ | ✓ | ✓ |

FIG. 5

ULTRA-WIDEBAND (UWB) RECEIVER DEVICE AND METHOD FOR OPERATING A UWB DEVICE

BACKGROUND

The IEEE 802.15.4a standard specifies an impulse-radio ultra-wideband (IR-UWB) physical layer (PHY) protocol. Wireless networks that utilize the IEEE 802.15.4a standard are being implemented for indoor ranging and localization applications. IR-UWB networks employ a train of short radio pulses to estimate channel impulse response. State-of-the-art IR-UWB devices are capable of instant and precise distance measurement, typically to within 10 cm accuracy, even in complicated indoor environments. However, such high precision performance typically comes at cost of high power consumption, which can be challenging for IR-UWB devices in portable and battery-powered applications. Thus, it is important that IR-UWB devices be energy efficient while still providing acceptable performance.

SUMMARY

Embodiments of a method and a device are disclosed. In an embodiment, a method for operating an ultra-wideband (UWB) device is disclosed. The method involves powering down a first receive path of a multipath UWB device while leaving a second receive path of the multipath UWB device powered up, powering down channel estimation, tracking, and demodulation functions of the second receive path, and performing an acquisition function using the second receive path while the first receive path is powered down and while the channel estimation, tracking, and demodulation functions of the second receive path are powered down.

In an embodiment, the acquisition function comprises analog-to-digital conversion (ADC) and correlator functions.

In an embodiment, the method further involves performing the channel estimation, tracking, and demodulation functions when presence of an UWB signal is detected, wherein only one receive path is used to implement the channel estimation, tracking, and demodulation functions and all other receive paths are powered down while the powered up receive path implements the channel estimation, tracking, and demodulation functions.

In an embodiment, the acquisition function comprises ADC and correlator functions, and the method further includes, when presence of an UWB signal is detected, powering down the acquisition function and performing the channel estimation, tracking, and demodulation functions, wherein only one receive path is used to implement the channel estimation, tracking, and demodulation functions and all other receive paths are powered down while the powered up receive path implements the channel estimation, tracking, and demodulation functions.

In an embodiment, the method further involves performing the channel estimation, tracking, and demodulation functions when presence of an UWB signal is detected, wherein more than one receive path is used to implement the channel estimation, tracking, and demodulation functions.

In an embodiment, the method further involves performing the channel estimation function when presence of an UWB signal is detected, wherein more than one of the receive paths are used to implement the channel estimation function, and performing the demodulation function after the channel estimation function is completed, wherein only one receive path is used to implement the demodulation function.

In an embodiment, the multipath UWB device receives an impulse-radio ultra-wideband (IR-UWB) signal.

In an embodiment, only two receive paths are available for performing the acquisition function such that only the second receive path is used to implement the acquisition function and the first receive path is powered down during the acquisition function.

In an embodiment, a computer program product including executable instructions encoded in a non-transitory computer readable medium which, when executed by the UWB device, carries out or controls the above-described method.

In another embodiment, a method for operating a UWB device is disclosed. The method involves powering down at least one receive path of a multipath UWB device while leaving only one receive path powered up, powering down channel estimation, tracking, and demodulation functions of the receive path that is powered up, and performing an acquisition function using the powered up receive path while all other receive paths are powered down and the channel estimation, tracking, and demodulation functions of the powered up receive path are powered down.

In an embodiment, the acquisition function comprises ADC and correlator functions.

In an embodiment, the method further includes performing the channel estimation, tracking, and demodulation functions when presence of an UWB signal is detected, wherein only one receive path is used to implement the channel estimation, tracking, and demodulation functions and all other receive paths are powered down while the powered up receive path implements the channel estimation, tracking, and demodulation functions.

In an embodiment, the acquisition function comprises ADC and correlator functions, and the method further involves, when presence of an UWB signal is detected, powering down the acquisition function and performing the channel estimation, tracking, and demodulation functions, wherein only one receive path is used to implement the channel estimation, tracking, and demodulation functions and all other receive paths are powered down while the powered up receive path implements the channel estimation, tracking, and demodulation functions.

In an embodiment, the method further involves performing the channel estimation, tracking, and demodulation functions when presence of an UWB signal is detected, wherein more than one receive path is used to implement the channel estimation, tracking, and demodulation functions.

In an embodiment, the method further involves performing the channel estimation function when presence of an UWB signal is detected, wherein more than one of the receive paths are used to implement the channel estimation function, and performing the demodulation function after the channel estimation function is completed, wherein only one receive path is used during the demodulation function.

In an embodiment, the multipath UWB device receives an IR-UWB signal.

In an embodiment, a computer program product including executable instructions encoded in a non-transitory computer readable medium which, when executed by the UWB device, carries out or controls the above-described method.

A UWB device is also disclosed. The UWB device includes a first receive path configured to implement acquisition, channel estimation, tracking, and demodulation functions, a second receive path configured to implement acquisition, channel estimation, tracking, and demodulation functions, and a processor configured to power down the first receive path while leaving the second receive path powered up during the acquisition function, and power down the channel estimation, tracking, and demodulation functions of the second receive path during the acquisition function.

In an embodiment of the UWB device, the first receive path includes ADC, correlator, and acquisition blocks to implement the acquisition function and wherein the ADC, correlator, and acquisition blocks remain powered up during implementation of the acquisition function.

In an embodiment of the UWB device, the processor is further configured to power up the first receive path when presence of a UWB signal is detected, and power up the channel estimation, tracking, and demodulation functions of the second receive path when presence of a UWB signal is detected.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 5 is a table that represents different modes of operation of the digital baseband processor of FIG. 3-4C.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
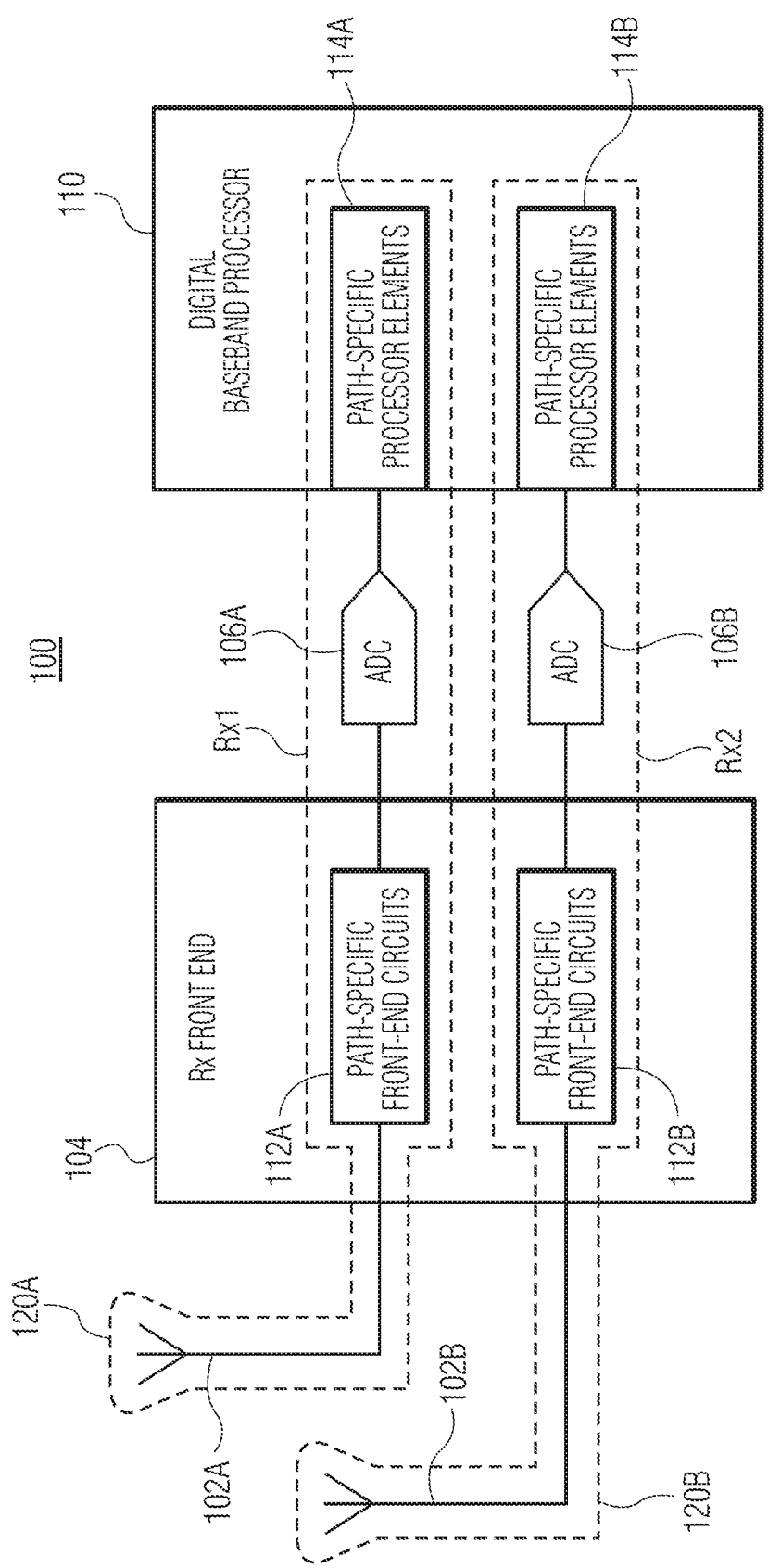
FIG. 1 depicts an example of a wireless RF receiver that includes two antennas, a receiver front-end, two analog-to-digital converters (ADCs), and a digital baseband processor.

FIG. 1 depicts an example of a wireless RF receiver 100 that includes two antennas 102A and 102B, a receiver front-end 104, two analog-to-digital converters (ADCs 106A and 106B), and a digital baseband processor 110. In an embodiment, the receiver front-end includes two path-specific front-end circuits 112A and 112B, with each front-end circuit including, for example, amplifiers, mixers, and filters as is known in the field. The digital baseband processor may include digital circuitry, including path-specific processor elements 114A and 114B, to process digital signals received from the ADCs. In the embodiment of FIG. 1, the receiver includes two receive paths 120A and 120B, a first receive path (Rx1) 120A that includes the first antenna, the first front-end circuit, the first ADC, and the first path-specific processor elements and a second receive path (Rx2) 120B that includes the second antenna, the second front-end circuit, the second ADC, and the second path-specific processor elements. In an embodiment, the wireless RF receiver is an impulse radio ultra-wideband (IR-UWB) receiver that is configured to be compatible with the IEEE 802.15.4a standard, which is a physical layer (PHY) standard. In operation, RF energy is received on the antennas and converted to analog signals at the receiver front-end. The analog signals are converted to digital signals by the ADCs and the digital baseband processor processes the digital signals and demodulates the digital signals to provide digital data that is output for further processing.

Although the wireless RF receiver 100 is a multipath receiver that includes two receive paths 120A and 120B, the wireless RF receiver may include more than two receive paths. Additionally, in an embodiment, receive paths of the multipath wireless RF receiver may share an antenna such that, for example, the path-specific front-end circuits 112A and 112B of the receiver front-end 104 share the same antenna. Additionally, in an embodiment, the ADCs 106A and 106B may be integrated on the same integrated circuit (IC) device as the digital baseband processor 110.

Figure 2:
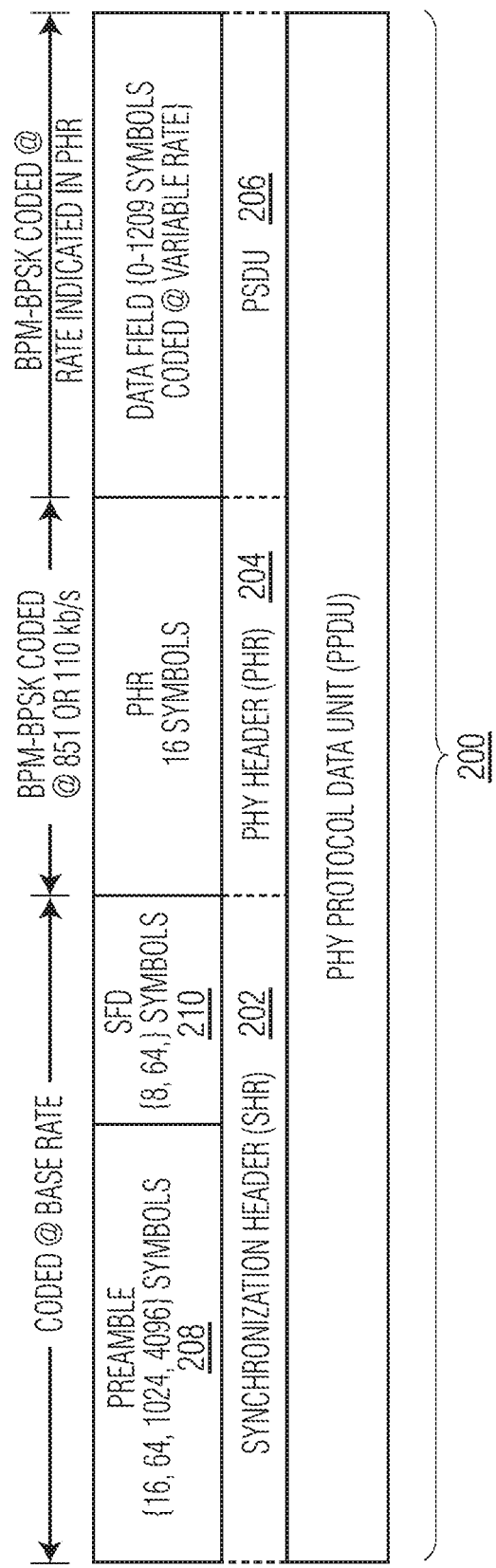
FIG. 2 depicts the format of an ultra-wideband frame as specified in the IEEE 802.15.4a standard.

As mentioned above, in an embodiment, the wireless RF receiver 100 is configured to be compatible with the IEEE 802.15.4 standard. FIG. 2 depicts the format of an ultra-wideband PHY frame 200 as specified in the IEEE 802.15.4a standard. As shown in FIG. 2, the UWB PHY frame (also referred to as a PHY protocol data unit (PPDU)), includes a synchronization header (SHR) 202, a physical layer (PHY) header (PHR) 204, and a physical layer (PHY) service data unit (PSDU) 206. According to the IEEE 802.15.4a standard, the synchronization header (SHR) is coded at the base rate and includes a preamble (16, 64, 1024, or 4069 symbols) 208 and a start-of-frame delimiter (SFD) (8 or 64 symbols) 210, the PHY header (PHR) is burst position modulation-binary phase shift keying (BPM-BPSK) coded at 851 or 110 kb/s and includes 16 symbols, and the PHY service data unit (PSDU) (also known as the data field) is BPM-BPSK coded at the rate indicated in the PHY header (PHR) and may range in size from 0-1209 symbols.

As is known in the field, the synchronization header (SHR) 202 is used to acquire synchronization. In particular, the preamble 208 is used for frame detection, timing synchronization, and carrier frequency offset recovery, and the SFD carried in the SFD field 210 is used for frame synchronization. The PHY header (PHR) 204 is used to convey information used to decode the data in the PHY service data unit (PSDU) 206, including the data rate used to transmit the PSDU, the length of the current frame's preamble, and the length of the packet.

Figure 3:
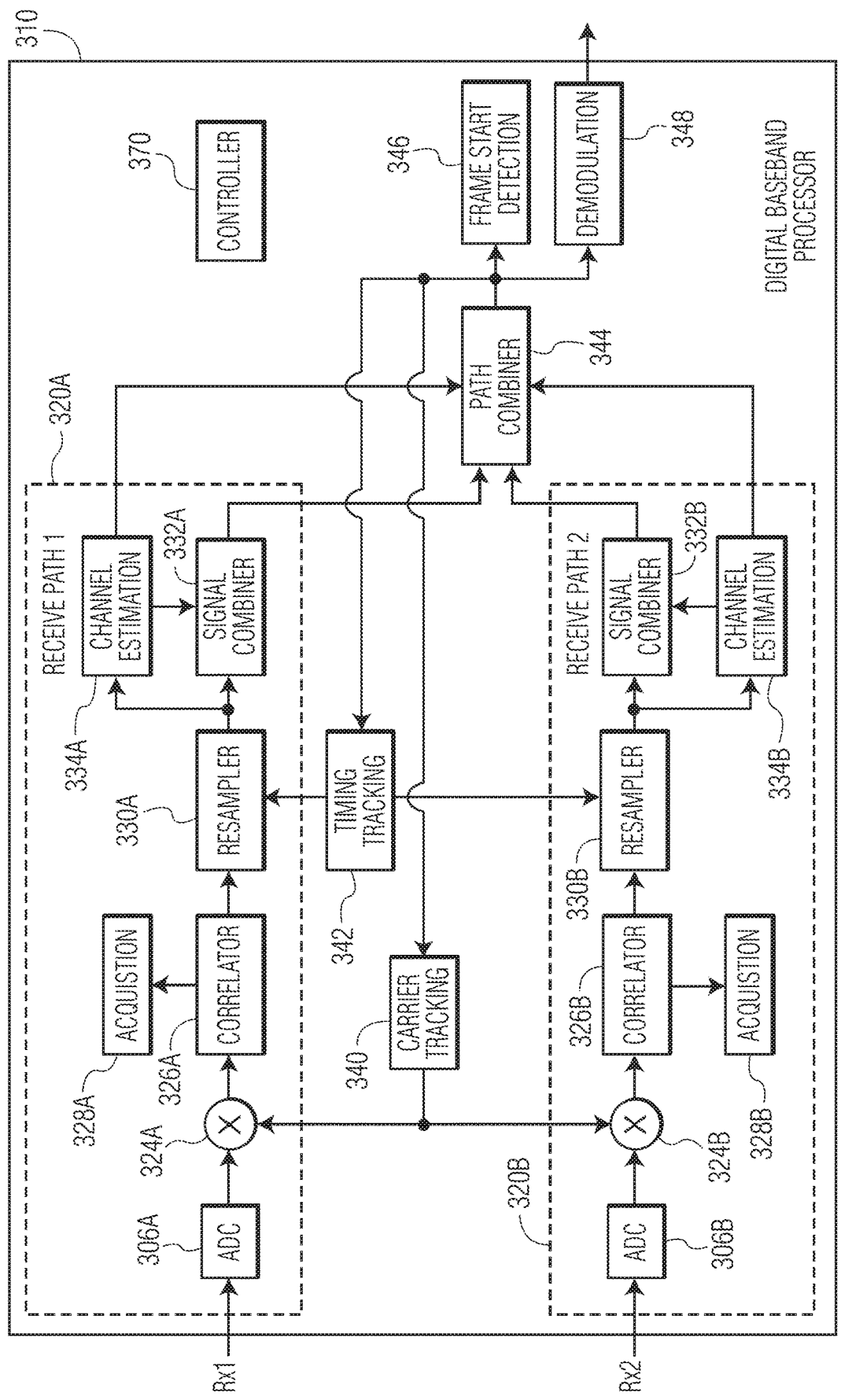
FIG. 3 depicts a functional block diagram of a digital baseband processor of a wireless RF receiver such as the wireless RF receiver depicted in FIG. 1.

FIG. 3 depicts a functional block diagram of a digital baseband processor 310 of a wireless RF receiver such as the wireless RF receiver 100 depicted in FIG. 1. In the embodiment of FIG. 3, the digital baseband processor is an IC device and the ADCs 306A and 306B are incorporated into the same IC device as the digital baseband processor. As depicted in FIG. 3, the digital baseband processor includes two receive paths 320A and 320B, with each receive path including path-specific elements that include an ADC 306A and 306B, a mixer 324A and 324B, a correlator block 326A and 326B, an acquisition block 328A and 328B, a resampler block 330A and 330B, a signal combiner block 332A and 332B, and a channel estimation block 334A and 334B. The digital baseband processor also shares some functional blocks amongst the two receive paths, the shared functional blocks including a carrier tracking block 340, a timing tracking block 342, a path combiner block 344, a frame start detection block 346, and a demodulation block 348. In the embodiment of FIG. 3, the digital baseband processor includes power control circuits that can be used to power up and power down the functional blocks of the digital baseband processor. For example, the digital baseband processor may include a controller 370 that implements the power control features as described below. In an embodiment, the controller controls the opening and closing of power control switch circuits of the digital baseband processor in response to information generated within the digital baseband processor.

Operation of the digital baseband processor 310 is described with reference to FIG. 3. In particular, operation is described with reference to receive path 1 (Rx1) 320A of the digital baseband processor although the description applies also to receive path 2 (Rx2) 320B of the digital baseband processor. Moving generally from left to right, an analog signal from the RF front-end (see FIG. 1) is received at the ADC 306A. The ADC converts the analog signal to a digital signal and the digital signal is provided to the mixer 324A. The mixer mixes the received signal with the carrier signal to downconvert the signal to an intermediate frequency and provides the intermediate signal to the correlator block 326A. In an embodiment, the correlator block correlates the received digital data with known preamble symbols to identify correspondence and implements a dispreading function as is known in the field. The correlator block provides the correlated information to the acquisition block. The acquisition block 328A is configured to determine whether a signal has been acquired based on the information received from the correlator block. In an embodiment, the acquisition block is configured to compare a signal strength value of the received signal to a programmed signal strength threshold and to assert that a signal has been acquired when the signal strength of the received signal exceeds the signal strength threshold.

The correlator block 326A also passes the received signal through to the resampler block 330A. The resampler block corrects for timing errors that may exist. For example, the resampler block may decrease the sampling rate or increase the sampling rate and/or shift the phase of the sampling rate.

The resampler block 330A provides the resampled digital signal to the signal combiner block 332A and to the channel estimation block 334A. The channel estimation block is configured to determine the magnitude and the time-of-flight (e.g., phase) of each multipath component of the received signal. The signal combiner block is configured to counter the effects of multipath fading and may involve combining signals from multiple correlators, each correlator assigned to a different multipath component. Functions implemented by the signal combiner block and the channel estimation block are known in the field.

The path combiner block 344 receives inputs from the signal combiner block 332A and from the channel estimation block 334A and, in an embodiment, is configured to coherently combine the received signals using a different scale factor. In an embodiment, the path combiner block implements maximal ratio combining (MRC) as is known in the field. The output of the path combiner block is provided to the frame start detection block 346 and to the demodulation block 348. The frame start detection block is configured to detect the symbols that indicate the start of a frame such as the SFD field 210 of the PHY protocol data unit 200 shown in FIG. 2. The demodulation block is configured to extract the original information bearing signal from the modulated carrier signal and to output the original information as digital data. Functions of the frame start detection block and the demodulation block are known in the field.

The carrier tracking block 340 is configured to track the frequency of the carrier signal. In an embodiment, the carrier tracking block compensates for residue in the carrier frequency offset (CFO), which may be a function of the mismatch between the transmission local oscillator (LO) frequency and the receive LO frequency. Functions of the carrier tracking block are known in the field.

The timing tracking block 342 is configured to track the timing (e.g., phase) of the carrier signal. In an embodiment, the timing tracking block determines a sampling frequency offset (SFO) and provides timing correction coefficients to the resampler 330A and 330B. Functions of the timing tracking block are known in the field.

In an embodiment, the functions of the digital baseband processor 310 are categorized into three function-based categories, including an acquisition function, a channel estimation function, and a tracking and demodulation function.

In an embodiment, the acquisition function involves determining that a signal formatted according to the PHY protocol has been detected. For example, the acquisition function involves determining that an UWB signal (e.g., in the form of a frame formatted according to the IEEE 802.15.4a) is being received at the IR-UWB device. In an embodiment, the acquisition function is implemented via the ADCs 306A and 306B, the correlator blocks 326A and 326B, and the acquisition blocks 328A and 328B. It should be noted that the mixers 324A 324B can be operated such that the mixers do not change the incoming signal, effectively "bypassing" the mixers 324A and 324B. As such, in an embodiment, the acquisition function does not rely on operations from the mixers 324A and 324B, the resampler blocks 330A and 330B, the signal combiner blocks 332A and 332B, the channel estimation blocks 334A and 334B, the carrier tracking block 340, the timing tracking block 342, the path combiner block 344, the frame start detection block 346, and the demodulation block 348.

In an embodiment, the channel estimation function involves estimating channel characteristics so that filter coefficients can be generated for received signals. In an embodiment, the channel estimation function is implemented via the ADCs 306A and 306B, the mixers 324A and 324B, the correlator blocks 326A and 326B, the resampler blocks 330A and 330B, the signal combiner blocks 332A and 332B, the channel estimation blocks 334A and 334B, the carrier tracking block 340, the timing tracking block 342, and in some instances the path combiner block 344. As such, in an embodiment, the channel estimation function does not involve operations from the acquisition blocks 328A and 328B, the frame start detection block 346, and the demodulation block 348.

In an embodiment, the tracking and demodulation function involves carrier and timing tracking (e.g., determining frequency/timing offsets) and demodulating the received signals to extract the original information-bearing signal from a carrier signal. The tracking and demodulation function is implemented by the ADCs 306A and 306B, the mixers 324A and 324B, the correlator blocks 326A and 326B, the resampler blocks 330A and 330B, the signal combiner blocks 332A and 332B, the carrier tracking block 340, the timing tracking block 342, the path combiner block 344, the frame start detection block 346, and the demodulation block 348. As such, in an embodiment, the tracking and demodulation function does not involve operations from the acquisition blocks 328A and 328B and the channel estimation blocks 334A and 334B.

In an embodiment, the functional blocks, including the ADCs 306A and 306B, the mixers 324A and 324B, the correlator blocks 326A and 326B, the acquisition blocks 328A and 328B, the resampler blocks 330A and 330B, the signal combiner blocks 332A and 332B, the channel estimation blocks 334A and 334B, the carrier tracking block 340, the timing tracking block 342, the path combiner block 344, the frame start detection block 346, and the demodulation block 348 are implemented in the digital baseband processor 310 via electrical circuits, such as an application-specific integrated circuit (ASIC) and/or in a microprocessor circuit, such as a microcontroller IC device, that executes computer readable instructions. In an embodiment, the functional blocks are implemented in an IC device in a combination of hardware, software, and/or firmware.

As indicated above, power consumption is an important characteristic of IR-UWB wireless RF receivers in networks that utilize the IEEE 802.15.4a standard at the PHY. In operation of an IR-UWB network, the SHR field (FIG. 2, 202) is used for frequency and timing synchronization between IR-UWB devices and synchronization operations account for a substantial portion of the power consumption during frame reception. In particular, power consumption per unit time is high during frequency and timing synchronization because computation-intensive hardware is employed in the digital baseband processor to seize weak radio signals that are normally below the noise floor and synchronization hardware stays active all of the time before a frame is detected because there is no prior information on time-of-arrival. It has been realized that a wireless RF receiver can be dynamically configured to improve the power efficiency of an IR-UWB wireless RF receiver in a manner that balances the magnitude of the power efficiency versus degradation in receiver quality, which may be reflected in an increased bit error rate (BER). In an embodiment, the dynamic configuration of a wireless RF receiver involves powering down a first receive path of a multipath UWB device while leaving a second receive path powered up, powering down channel estimation, tracking, and demodulation functions of the second receive path, and performing an acquisition function using the second receive path while the first receive path is powered down and while the channel estimation, tracking, and demodulation functions of the second receive path are powered down. In an embodiment, a functional block is considered power down when the functional block is not able to perform the corresponding function because the corresponding circuits do not have the necessary power because, for example, the corresponding circuits are power-gated and/or clock-gated. Likewise, a functional block is considered powered up when the functional block is powered up such that the functional block is able to perform the corresponding function. By powering down certain elements of the wireless RF receiver while the acquisition function is performed, power consumption by elements that are not directly involved in the acquisition function is reduced, thus improving the energy efficiency of the UWB device. Applying such a dynamic configuration technique to IR-UWB devices that utilize the IEEE 802.15.4a standard for high precision ranging can extend the battery life of such IR-UWB devices.

An example of a technique for operating a wireless RF receiver that includes the digital baseband processor 310 of FIG. 3 to conserve power is described with reference to FIGS. 4A-4C. In the example described herein, the baseband receiver is an IR-UWB device that implements the IEEE 802.15.4 standard at the PHY.

Figure 4A:
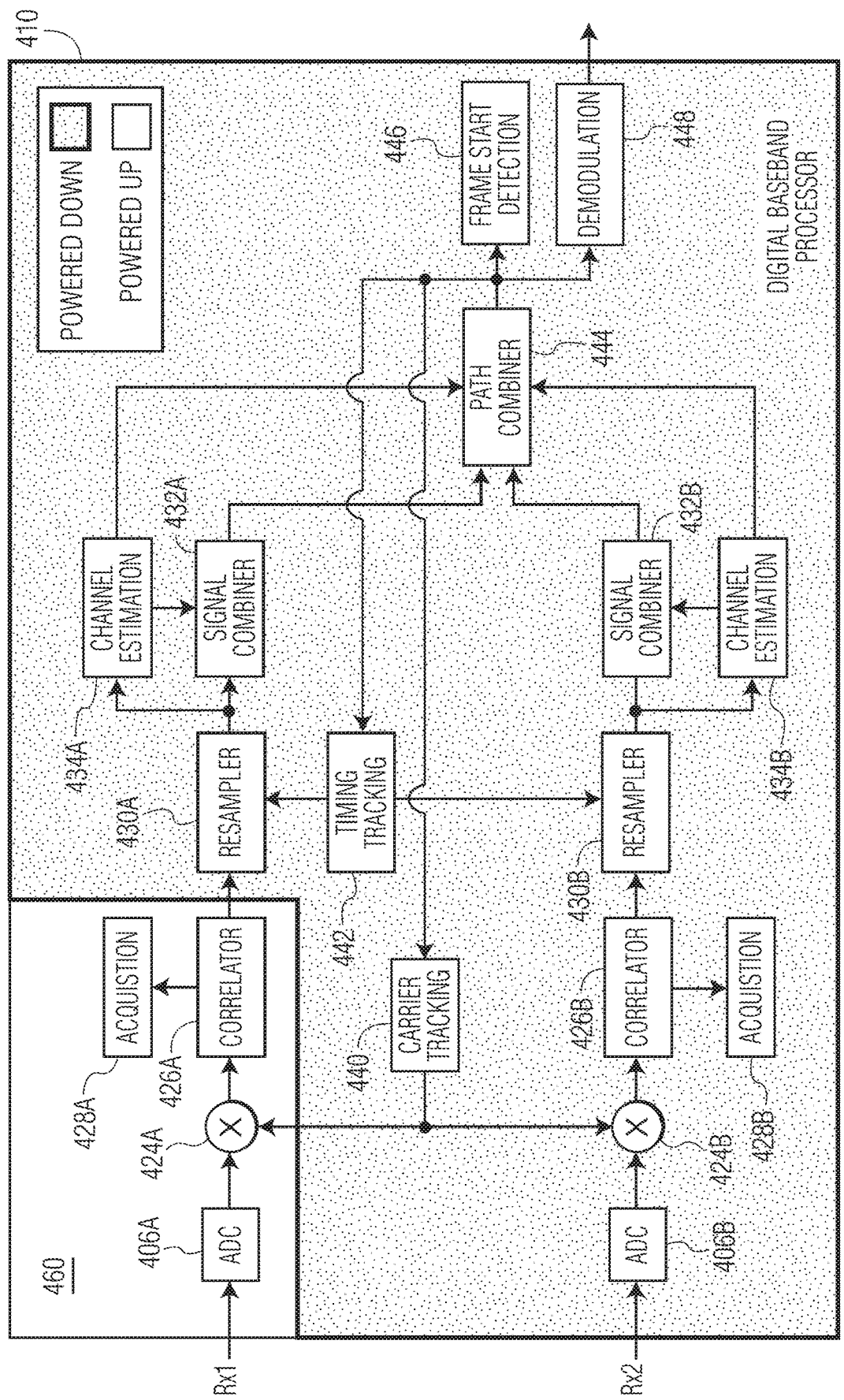
FIG. 4A illustrates the digital baseband processor of FIG. 3 in a state in which elements that correspond to the acquisition function for one receive path are powered up and all other elements of the digital baseband processor are power down.

FIG. 4A illustrates a digital baseband processor 410 similar to the digital baseband processor 310 of FIG. 3 in a state in which elements that correspond to the acquisition function for one receive path are powered up and all other elements of the digital baseband processor are power down (e.g., power-gated and or clock-gated). In the example of FIG. 4A, the box 460 (which is textured) encompasses the functional blocks that are powered up (e.g., the ADC 406A, the mixer 424A, the correlator block 426A, and the acquisition block 428A) while all of the other functional blocks (which are within the textured region) are power down. It should be noted that although the mixer 424A may be powered up in this state, the mixer 424A is effectively bypassed during the acquisition function because the input signal is not changed by the mixer. In other embodiments, it may be possible to power down the mixer 424A during execution of the acquisition function. While the digital baseband processor 410 is in the state illustrated in FIG. 4A, the acquisition function is enabled and all other functions are disabled. Thus, the digital baseband processor is able to continuously check for the existence of IR-UWB PPDUs in the environment. Once the presence of a PPDU is detected, other functional blocks of the digital baseband processor can be powered up to implement additional aspects of the receive process.

Figure 4B:
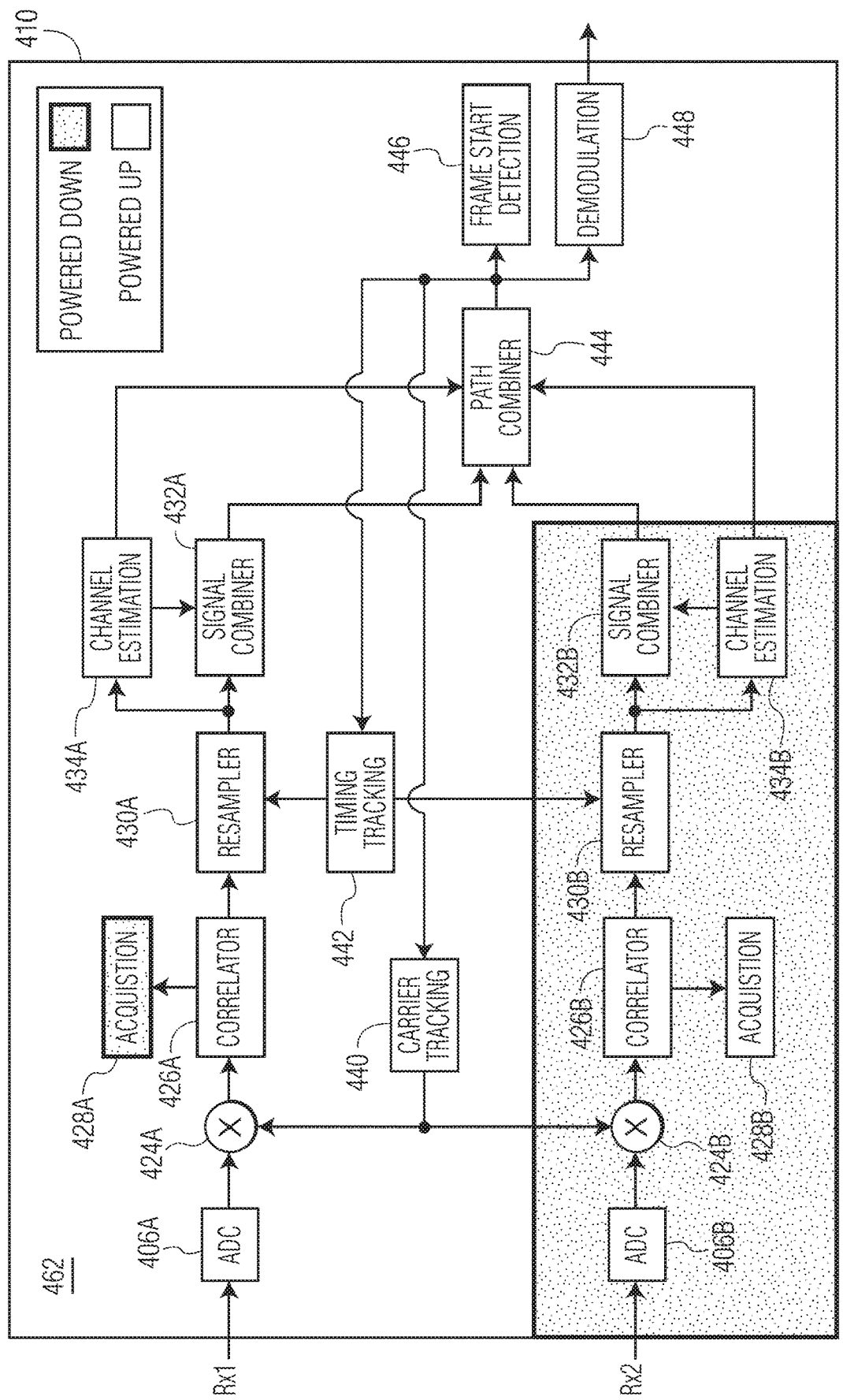
FIG. 4B illustrates the digital baseband processor of FIG. 3 in a state in which elements that correspond to additional receive functions of the digital baseband processor (e.g., channel estimation and tracking and demodulation) are powered up.

FIG. 4B illustrates the digital baseband processor 410 in a state in which elements that correspond to additional receive functions of the digital baseband processor (e.g., channel estimation and tracking and demodulation) are powered up. In the example of FIG. 4B, the box 462 (which is textured) encompasses the functional blocks that are powered up while functional blocks outside the box 462 (which are within the textured region) remain powered down. As illustrated in FIG. 4B, only one receive path is powered up (receive path 1), and functional blocks that are specific to receive path two (receive path 2) remain powered down. In particular, the ADC 406B, the mixer 424B, the correlator block 426B, the acquisition block 428B, the resampler block 430B, the signal combiner block 432B, and the channel estimation block 434B of receive path 2 (FIG. 3, receive path 320B) remain powered down.

In the embodiment as illustrated in FIG. 4B, the acquisition block 428A of receive path 1 is powered down (as indicated by the texturing) once a signal has been acquired, e.g., detected, to conserve power. Although the acquisition block 428A of receiver path 1 is powered down after signal acquisition to conserve power, in other embodiments, the acquisition block may remain powered up after signal acquisition and while the channel estimation and tracking and demodulation functions are implemented. In a wireless RF receiver that includes more than two receive paths, in an embodiment, only one receive path is powered up and all other receive paths are powered down while the powered up receive path implements, for example, channel estimation, tracking, and demodulation functions.

Figure 4C:
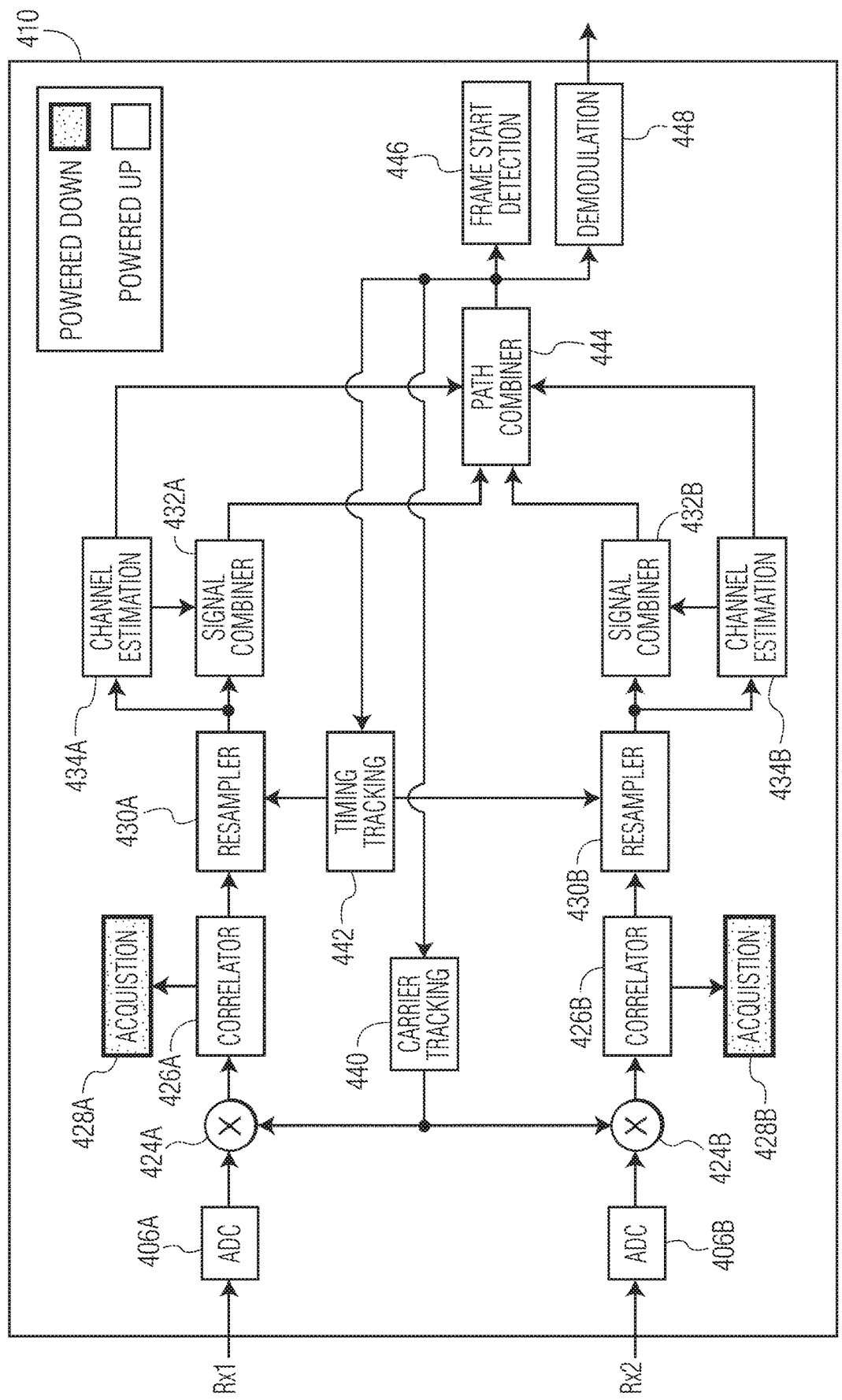
FIG. 4C illustrates the digital baseband processor of FIG. 3 in a state in which both receive paths (receive path 1 and receive path 2) are powered up and the acquisition functions of both receive paths 1 and 2 are powered down.

In an embodiment as illustrated in FIG. 4C, after a signal is acquired while the digital baseband processor 410 is in the state illustrated in FIG. 4A, the digital baseband processor is put into a state in which both receive paths (receive path 1 and receive path 2) are powered up (as indicated by the absence of texturing) and the acquisition functions of both receive paths 1 and 2 are powered down (as indicated by the texturing). In particular, the acquisition blocks 428A and 428B of both receive paths 1 and 2 are powered down while all other functional blocks of the digital baseband processor are powered up. By powering up both receive paths 1 and 2 after signal acquisition, the receive quality (e.g., in terms of BER) can be improved over the case in which the digital baseband processor is operated with receive path 2 powered down as illustrated in FIG. 4B.

As indicated above, the power state of the functional blocks of the digital baseband processor 410 can be dynamically adjusted to balance power efficiency versus receive quality, e.g., in terms of BER.

FIG. 5 is a table that represents different modes of operation (also referred to as "configuration profiles") of the digital baseband processor 310 and 410 of FIGS. 3-4C, the modes of operation referred to as mode 0 (RxMode_0), mode 1 (RxMode_1), mode 2 (RxMode_2), and mode 3 (RxMode_3). For each mode of operation, the table indicates the power state (e.g., powered up or powered down), on a per-function and a per-receive path basis. In the example of FIG. 5, a "check" mark indicates that the functional blocks associated with the function are powered up while the corresponding function is implemented by the digital baseband processor and no check mark indicates that the functional blocks associated with the function are not powered up (e.g., powered down) while the corresponding function is implemented by the digital baseband processor.

As represented in FIG. 5, when the digital baseband processor 310 and 410 is operated in mode 0 (RxMode_0) during the acquisition function, only the acquisition related functional blocks for receive path 1 (Rx1) are powered up, and after a signal is acquired, only the functional blocks associated with channel estimation and tracking and demodulation for receive path 1 (Rx1) are powered up. While mode 0 (RxMode_0) is energy efficient, mode 0 (RxMode_0) may exhibit reduced receive quality (e.g., an increased BER). When the digital baseband processor is operated in mode 1 (RxMode_1), during the acquisition function, only the acquisition related functional blocks for receive path 1 (Rx1) are powered up, and after a signal is acquired, the functional blocks associated with channel estimation and tracking and demodulation for both receive path 1 (Rx1) and receive path 2 (Rx2) are powered up. Mode 1 (RxMode_1) offers power savings during the acquisition stage while providing high quality reception during the channel estimation and tracking and demodulation stages.

When the digital baseband processor 310 and 410 is operated in mode 2 (RxMode_2), during the acquisition function, only the acquisition related functional blocks for receive path 1 (Rx1) are powered up and after a signal is acquired, the functional blocks associated with channel estimation for both receive path 1 (Rx1) and receive path 2 (Rx2) are powered up until the channel estimation function is completed. Once the channel estimation function is completed, only the functional blocks associated with tracking and demodulation for receive path 1 (Rx1) are powered up. Operational mode 2 (RxMode_2), provides power savings during acquisition and tracking and demodulation but implements channel estimation with the corresponding functional blocks of both receive paths 1 and 2 (Rx1 and Rx2) powered up. When the digital baseband processor is operated in mode 3 (RxMode_3), the corresponding functional blocks for both receive paths 1 and 2 (Rx1 and Rx2) are powered up. In mode 3 (RxMode_3), the functional blocks associated with channel estimation and tracking and demodulation can be powered down during the acquisition function, which can still provide power savings over operational modes in which all of the functional blocks are powered up at all times.

In an embodiment, ultra-wideband or "UWB" refers to frequency ranges that correspond to the IEEE 802.15.4a standard, including the 250-750 MHz band, the 3,244-4,742 MHz band, and the 5,944-10,234 MHz band, although other bands are possible. Additionally, ultra-wideband or "UWB" may refer to a frequency range of 3.1-10.6 GHz.

Figure 6:
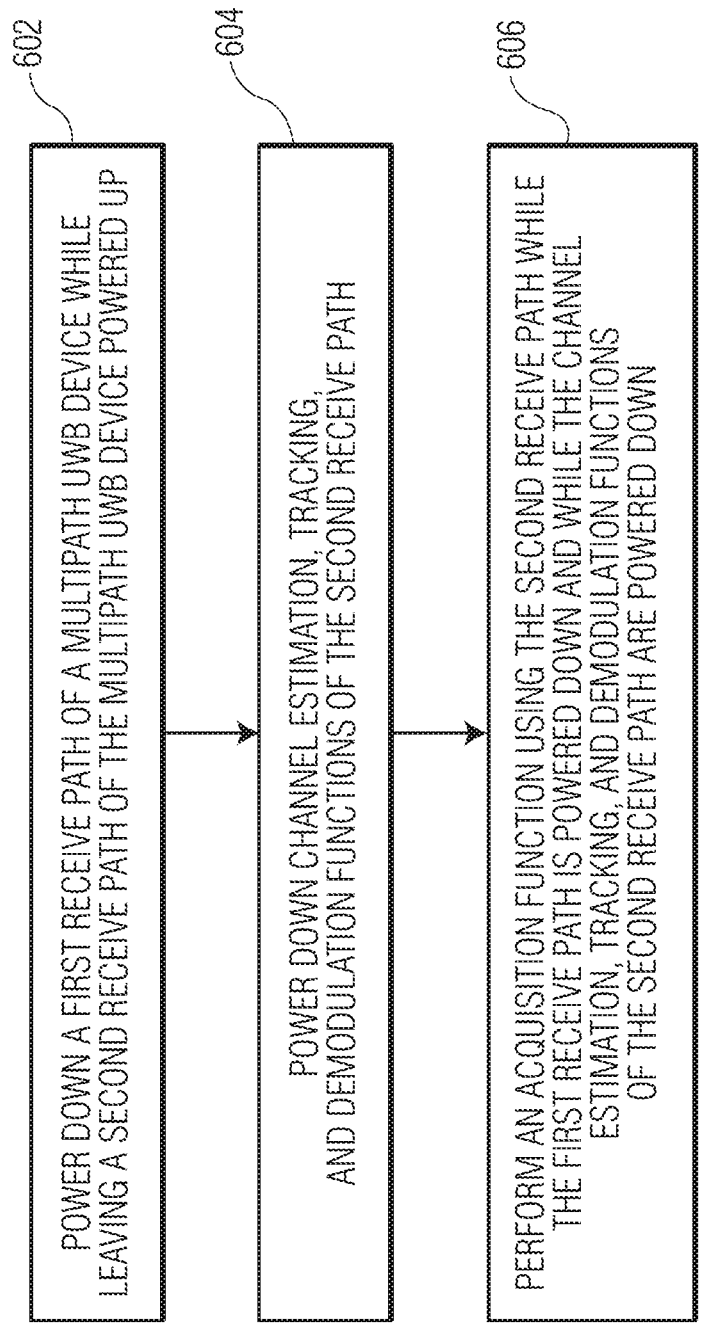
FIG. 6 is a process flow diagram of a method for operating a UWB device in accordance with an embodiment of the invention.

FIG. 6 is a process flow diagram of a method for operating a UWB device in accordance with an embodiment of the invention. At block 602, a first receive path of a multipath UWB device is powered down while a second receive path of the multipath UWB device is left powered up. At block 604, channel estimation, tracking, and demodulation functions of the second receive path are powered down. At block 606, an acquisition function is performed using the second receive path while the first receive path is powered down and while the channel estimation, tracking, and demodulation functions of the second receive path are powered down. In an embodiment, the method is implemented in a wireless RF receiver that includes a digital baseband processor as described above with reference to FIGS. 1-5. For example, the digital baseband processor 110, 310, 410 includes processor and memory circuits configured to store and execute computer readable instructions that implement the methods described herein. In an embodiment, the digital baseband processor includes a controller (e.g., controller 370) configured to coordinate the power control functions as described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium (e.g., memory circuits) for execution by the digital baseband processor. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating an ultra-wideband (UWB) device, the method comprising:
powering down a first receive path of a multipath UWB device while leaving a second receive path of the multipath UWB device powered up;
powering down channel estimation, tracking, and demodulation functions of the second receive path; and
performing an acquisition function using the second receive path while the first receive path is powered down and while the channel estimation, tracking, and demodulation functions of the second receive path are powered down.

2. The method of claim 1, wherein the acquisition function comprises analog-to-digital conversion (ADC) and correlator functions.

3. The method of claim 1 further comprising:
performing the channel estimation, tracking, and demodulation functions when presence of an UWB signal is detected, wherein only one receive path is used to implement the channel estimation, tracking, and demodulation functions and all other receive paths are powered down while the powered up receive path implements the channel estimation, tracking, and demodulation functions.

4. The method of claim 1, wherein the acquisition function comprises analog-to-digital conversion (ADC) and correlator functions, and further comprising:
when presence of an UWB signal is detected, powering down the acquisition function and performing the channel estimation, tracking, and demodulation functions, wherein only one receive path is used to implement the channel estimation, tracking, and demodulation functions and all other receive paths are powered down while the powered up receive path implements the channel estimation, tracking, and demodulation functions.

5. The method of claim 1 further comprising:
performing the channel estimation, tracking, and demodulation functions when presence of an UWB signal is detected, wherein more than one receive path is used to implement the channel estimation, tracking, and demodulation functions.

6. The method of claim 1 further comprising:
performing the channel estimation function when presence of an UWB signal is detected, wherein more than one of the receive paths are used to implement the channel estimation function; and
performing the demodulation function after the channel estimation function is completed, wherein only one receive path is used to implement the demodulation function.

7. The method of claim 1, wherein the multipath UWB device receives an impulse-radio ultra-wideband (IR-UWB) signal.

8. The method of claim 1, wherein only two receive paths are available for performing the acquisition function such that only the second receive path is used to implement the acquisition function and the first receive path is powered down during the acquisition function.

9. A computer program product comprising executable instructions encoded in a non-transitory computer readable medium which, when executed by the UWB device, carry out or control the method of claim 1.

10. A method for operating an ultra-wideband (UWB) device, the method comprising:
powering down at least one receive path of a multipath UWB device while leaving only one receive path powered up;
powering down channel estimation, tracking, and demodulation functions of the receive path that is powered up; and
performing an acquisition function using the powered up receive path while all other receive paths are powered down and the channel estimation, tracking, and demodulation functions of the powered up receive path are powered down.

11. The method of claim 10, wherein the acquisition function comprises analog-to-digital conversion (ADC) and correlator functions.

12. The method of claim 10, further comprising:
performing the channel estimation, tracking, and demodulation functions when presence of an UWB signal is detected, wherein only one receive path is used to implement the channel estimation, tracking, and demodulation functions and all other receive paths are powered down while the powered up receive path implements the channel estimation, tracking, and demodulation functions.

13. The method of claim 10, wherein the acquisition function comprises analog-to-digital conversion (ADC) and correlator functions, and further comprising:
- when presence of an UWB signal is detected, powering down the acquisition function and performing the channel estimation, tracking, and demodulation functions, wherein only one receive path is used to implement the channel estimation, tracking, and demodulation functions and all other receive paths are powered down while the powered up receive path implements the channel estimation, tracking, and demodulation functions.

14. The method of claim 10, further comprising:
- performing the channel estimation, tracking, and demodulation functions when presence of an UWB signal is detected, wherein more than one receive path is used to implement the channel estimation, tracking, and demodulation functions.

15. The method of claim 10, further comprising:
- performing the channel estimation function when presence of an UWB signal is detected, wherein more than one of the receive paths are used to implement the channel estimation function; and
- performing the demodulation function after the channel estimation function is completed, wherein only one receive path is used during the demodulation function.

16. The method of claim 10, wherein the multipath UWB device receives an impulse-radio ultra-wideband (IR-UWB) signal.

17. A computer program product comprising executable instructions encoded in a non-transitory computer readable medium which, when executed by the UWB device, carry out or control the method of claim 10.

18. An ultra-wideband (UWB) device comprising:
- a first receive path configured to implement acquisition, channel estimation, tracking, and demodulation functions;
- a second receive path configured to implement acquisition, channel estimation, tracking, and demodulation functions; and
- a processor configured to:
    - power down the first receive path while leaving the second receive path powered up during the acquisition function; and
    - power down the channel estimation, tracking, and demodulation functions of the second receive path during the acquisition function.

19. The UWB device of claim 18, wherein the first receive path includes ADC, correlator, and acquisition blocks to implement the acquisition function and wherein the ADC, correlator, and acquisition blocks remain powered up during implementation of the acquisition function.

20. The UWB device of claim 18, wherein the processor is further configured to:
- power up the first receive path when presence of a UWB signal is detected; and
- power up the channel estimation, tracking, and demodulation functions of the second receive path when presence of a UWB signal is detected.

* * * * *